Jan. 16, 1968 K. W. RAREY 3,363,552
METHODS AND APPARATUS FOR MINIMIZING SCREEN PATTERNS
IN XEROGRAPHY, ELECTROSTATIC SCREEN PROCESS
AND OTHER FORMS OF PRINTING
Filed Oct. 20, 1965 3 Sheets-Sheet 1

INVENTOR
KENNETH W. RAREY

BY
Mason, Porter, Willan & Brown
ATTORNEYS

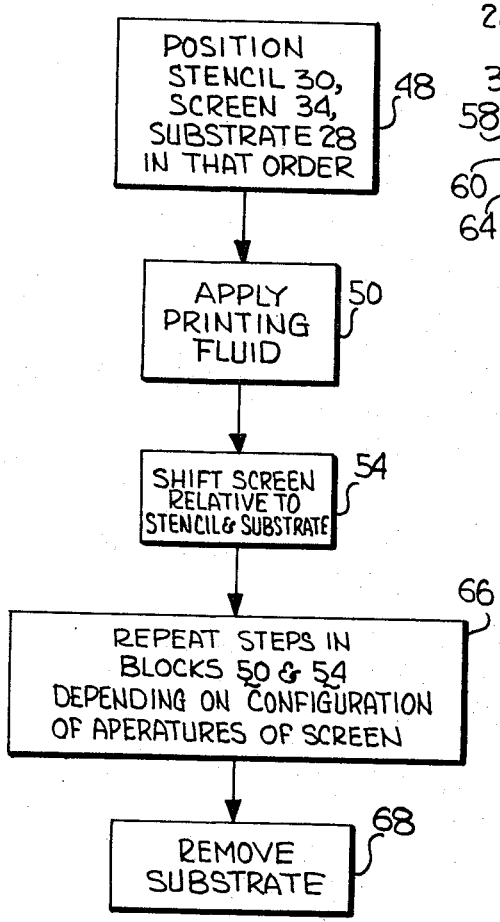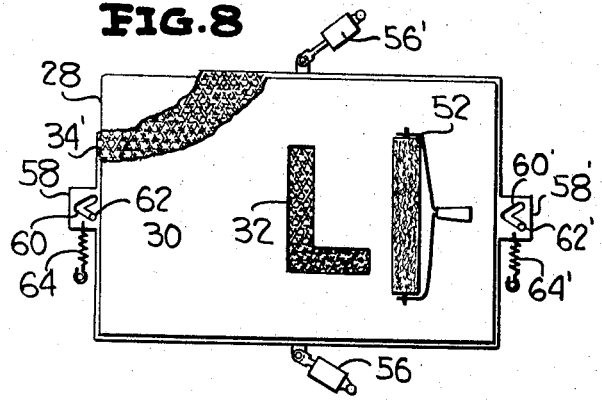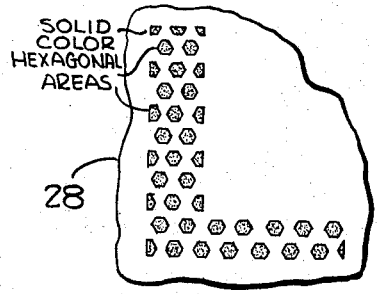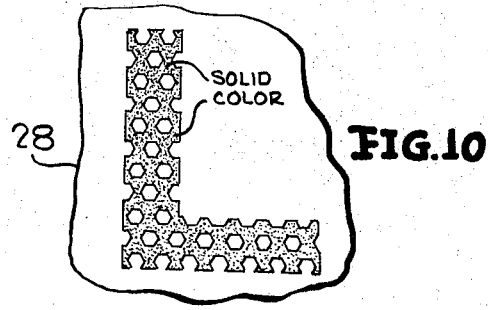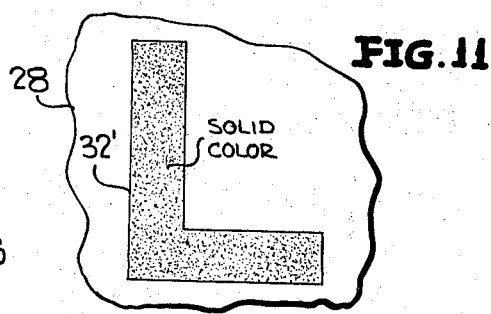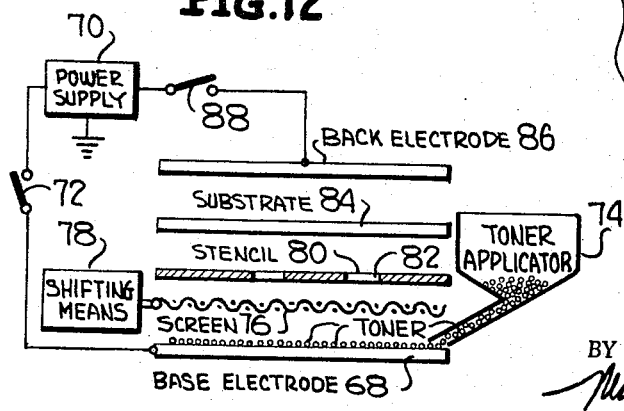

Jan. 16, 1968  K. W. RAREY  3,363,552
METHODS AND APPARATUS FOR MINIMIZING SCREEN PATTERNS
IN XEROGRAPHY, ELECTROSTATIC SCREEN PROCESS
AND OTHER FORMS OF PRINTING
Filed Oct. 20, 1965  3 Sheets-Sheet 3

INVENTOR
KENNETH W. RAREY

BY Mason, Porter, Diller & Brown
ATTORNEYS

United States Patent Office 3,363,552
Patented Jan. 16, 1968

3,363,552
METHODS AND APPARATUS FOR MINIMIZING SCREEN PATTERNS IN XEROGRAPHY, ELECTROSTATIC SCREEN PROCESS AND OTHER FORMS OF PRINTING
Kenneth W. Rarey, South Holland, Ill., assignor to Continental Can Company, Inc., New York, N.Y., a corporation of New York
Filed Oct. 20, 1965, Ser. No. 498,598
21 Claims. (Cl. 101—129)

This invention relates to printing and reproduction processes and more specifically to methods and apparatus for minimizing or eliminating the undesirable patterns caused by the screen in screen process printing and, as to xerographic reproductions, eliminating the poor resolution when reproducing indicia having extended areas so that a faithful reproduction of the desired indicia-bearing document may be obtained.

A number of different methods of printing such as xerography, electrostatic screen, and, perhaps, other forms of screen process, may exhibit a common deficiency, i.e., the inability to print or reproduce a uniform extended area. The reasons for such deficiencies are set forth hereinafter. A "uniform extended area" is one in which the shortest dimension of any indicia, character, figure, etc., exceeds to any great extent, the width of the usual typewritten indicia. For example, such areas are solid circles, rectangles, other geometric figures, wide bars or lines, etc. The larger the indicia, the greater the tendency for the center areas of the indicia to remain unprinted or un-reproduced when xerographic printing is employed. When screen printing is used, the inability to reproduce a uniform extended area is not a function of the magnitude of the area.

A method of reproducing copies of an indicia or image-bearing document is known as xerography which is an electrical method of photography. In the xerographic process, an electrically conductive plate is coated with a thin-uniform layer of a material, such as amorphous selenium, which is a good electrical insulator in the dark and which becomes electrically conducting when exposed to light. This plate is electrically charged in the dark, generally by depositing positive ions on the surface of the material while permitting electrons to flow by conduction into the metal plate. It will be readily understood that other known material may be employed to coat the plate and, also, the polarity may be negative. Thus, the plate so charged is essentially a charged parallel plate capacitor with the ionic surface deposition constituting one charged plate while the electron rich metal constitutes the other plate. An optical image may then be projected on to the surface of the material, which is, of course, a photo-conductive coating, rendering portions that are illuminated electrically conductive while the remaining surface area retains its insulating property. Conduction through the coating may thus discharge or neutralize some of the capacitor charge, leaving an electrically charged latent image. Tiny particles of dry ink, known as "toner," which have been pre-charged electrically with a charge opposite to that of the ionic surface charge of the photo-conductive coating, may then be introduced over the latent image. The toner is electrically attracted to the latent image and accumulates on the plate surface thus rendering the image visible.

Although a high degree of success has been attained when reproducing copies or patterns of certain characteristics, experience has shown that a faithful development of the latent image on the photo-conductive coating will occur except for extended areas. If the minimum distance associated with an area of the indicia or pattern is large compared to the thickness of the photo-conductive coating, the electric field associated with the indicia is negligibly small at locations external to the coating except near the edges of the indicia. The analogy to a charged parallel-plate capacitor is valid since the external field of the capacitor is of negligible intensity as the areal dimensions of the plate become large when compared to their separation. The absence of an external field reduces the reproduction quality since there is no electrical attraction by the latent image formed on the photo-conductive coating for the toner particles. Methods have been devised to overcome this deficiency although none has been very successful.

For example, if an image of an array of tiny optically reflecting dots on an optically non-reflecting background is projected onto a charged electrically conductive plate, an extended areal charged distribution in the image will be discharged at all locations of the dot pattern so positioned upon the coating. As a result, the previously large area is now perforated with a plurality of many small discharged regions so that the edge field effects are distributed throughout the area. Development of the dot images will now occur throughout any extended area of indicia to be subsequently reproduced. However, instead of having a uniform area one now has a substantially uniform background with an undeveloped superposed dot pattern. This reproduction can faithfully reproduce the form of that portion of the latent image, but it does not faithfully reproduce the brightness or saturation of that area. It will be intuitively clear that a uniformly developed area does not have the same appearance as an area "full of holes or dots." Furthermore, if there is detail elsewhere in the indicia or pattern for which the minimum dimensions are similar to those of the dimensions of the dots, and appreciable loss of resolution can occur. In summary, at least two deficiencies characterize the utilization of the superposed dot pattern which are the reduction of resolution and the failure to faithfully reproduce tones and/or proper degree of saturation.

The latent image upon the photo-conductive coating can be developed and transferred to a substrate, such as a sheet of paper and the toner fixed to the substrate, as by heating, so as to yield a substantially permanent record. The photo-conductive plate can be recharged and used repeatedly.

It has been found that the deficiencies which characterize the use of a superposed dot pattern can be greatly minimized by repeating the normal steps several times and shifting the dot pattern each time. For example, a reproduction is produced on a substrate as previously described. Naturally, this reproduction exhibits the defects set forth. Next, the plate is charged, exposed and developed once more but this time the superposed dot pattern is slightly shifed relative to the pattern to be reproduced. The latent image is developed and transferred to the same substrate as before, care being exercised to register the reproduced images.

In the large areas of the pattern to be reproduced, the dots will not appear in the same location as previously (due to the shifting) so that a larger percent of the area will now be covered with toner particles. In the fine details of the pattern to be reproduced, areas which previously had been completely obscured by the dots are now revealed, thus improving the resolution. This process may be repeated several times with simply a shift in the dot pattern each time. It is also desirable to rotate the dot pattern about 15 degrees during each shift so as to avoid moiré patterns.

The experiences thus far have involved random shifting of the dot pattern relative to the image to be reproduced. The dot pattern is exhibited less in a composite print than in a print made with a single exposure. The question now arises as to how many shifts should be employed for the maximum advantage to accrue. The experience in formulating and setting forth the present invention, appears to indicate that somewhere between three and six shifts are required for best results although one, two or more than six shifts may produce acceptable results. Understandably, too many shifts are no better than not enough. Although new areas of the image to be produced may be revealed as additional printings on the substrate occur, previously exposed areas may be repeatedly exposed, and these areas acquire an excessive amount of toner and produce a subsequent deterioration of the print quality.

If the method could be controlled such that each shift of the pattern exposes only areas that have not been previously revealed, and if the number of steps required to reveal all areas can be simultaneously minimized, a high degree of identity between the copy of the original is indicated. Dot patterns of the type set forth do not permit this type of operation; however, a pattern with hexagonal rather than circular "dots," when properly arranged, will permit all areas of the image to be exposed and no area to be exposed more than once, the operation taking place in just three printings which requires two shifts followed by a third shift to return the hexagonal pattern to its original position. In addition, other patterns such as rectangular, square, triangular, pentagonal, may be arranged so as to produce statisfactory results.

The foregoing discussion has been directed to the xerographic type of reproduction although it has previously been indicated that screen printing also suffers from similar deficiencies in reproducing extended areas of the image. For example, a screen of the type used for supporting a stencil for screen process printing typically has about 35% to 50% of its area associated with the screen apertures while the remaining 50% to 65% is associated with the wires or threads of which the screen is woven. Consequently, any stencil supported by such a screen will have 50% to 65% of its area obscured by the screen. The screen thus has considerable influence over the image that will be printed. There is a tendency to feel that the role of the stencil is to define the pattern to be printed and that the screen serves simply as a support; however, since such a small percentage of the screen area consists of openings, the screen may influence the final pattern even more than the stencil. Accordingly, the proper entity for consideration is the screen-stencil combination. It is interesting to note that if one were to print on a white substrate using only the screen, the use of a black ink would resolve the screen apertures on the final print so that the result would be that of a relatively light gray area. Since only 35% to 50% of the area would be printed black and the 50% to 65% would be the background or white substrate, an observer would experience an additive effect which would produce the sensation of a moderate gray. Substituting inks of other colors would yield similar results. Accordingly, stimulation of perception of colors of low saturation would result.

The stimulation of perception of colors with higher saturation would result if one increases the amount of the area coated with ink relative to the amount that is uncoated. An area may be printed as previously set forth, the screen then moved to expose new regions of the substrate, reprinted, moved again, etc. Eventually, a completely black surface would be achieved although the ink may tend to "pile-up" in layers since the same area may be reprinted a plurality of times.

As taught by the present invention, if a screen or mask having hexagonal apertures of proper size and distribuion were employed, it would be possible to expose every portion of the substrate with no portion being exposed more than once, by three controlled positions of the screen relative to the substrate. Uniform inking at each position would result in complete, uniform coverage of the substrate. The color would now be indepndent of the additive ink-substrate effect set forth earlier.

An alternate method, but of questionable desirability, would be to fix the location of the screen relative to the substrate and simply force a sufficient amount of ink through the screen such that the ink spreads and covers an increased percentage, perphaps all, of the area confronting it by flowing behind the area obscured by the wires or threads of the screen. In fact, this appears to be practiced to some extent in substantially all screen process printing. However, there are disadvantages in this practice in that the ink coating may not be uniform. Further, if the screen supports a stencil, the resolution is adversely affected. If the stencil is a half-tone, poor resoltuion of the half-tone dots means a greatly contracted gray scale.

The deficiencies set forth do not occur, or are at least minimized, if the method of moving the screen is employed. If one wishes to print or coat only an extended, uniform area, the screen may be moved as described. If the screen supports a stencil with a pattern for which the finest details are very large when compared to the screen apertured area, the screen may be moved sufficiently to expose all appropriate areas without greatly influencing the resolution of the final print. However, if the fine details of the pattern and the screen apertures are of comparable size, then the screen must be moved while the stencil and substrate are fixed relative to each other. For half-tone stencils, the dot size associated with gray tones toward either end of a gray scale are in fact of a size to require such manipulation. Since a screen cannot be moved relative to such a stencil, an effective motion must be acquired by mounting several stencils on separate screens and printing through them in succession. Careful registration of the printed images must be maintained.

Accordingly, it is the principal object of the present invention to improve printing and document reproduction techniques for yielding copies which are substantially identical to the original from which the copy was prepared.

It is a further object of the present invention to provide a method and apparatus for permitting the complete printing or reproduction of extended areas of figures, patterns or other indicia to be printed or reproduced.

It is a further object of the present invention to provide a method and apparatus applicable to screen process reproductions for greatly influencing the resolution of a copy of an original when the detail of the original is of comparable size to the screen apertures.

It is a further object of the present invention to provide a method and apparatus employing a unique screen in a unique manner so as to enhance the quality of copies produced in certain types of printing and copying.

It is a further object of the present invention to provide a method and means for faithfully producing copies in screen process printing by shifting a screen having uniformly spaced apertures of a geometric configuration, to predetermined positions so as to expose once, and only once, all areas to be printed on the substrate.

It is a further object of the present invention to provide a method and apparatus applicable to electrostatic screen process printing wherein the printing process achieves superior quality through the uniform printing of all areas or indicia to be printed, the foregoing being accomplished through the manipulation of a screen having uniform, geometric apertures, the screen being shifted so as to expose once, and only once, all areas to be printed.

It is a still further object of the present invention to provide a method applicable to xerographic reproductions wherein extended areas may be uniformly reproduced through the utilization and shifting, at pre-selected times, a screen having uniform, geometric apertures, so arranged so that all areas to be reproduced are exposed once, and only once, to subsequently receive the toner material.

These and other objects of the present invention are achieved through the utilization of a screen having uniformly spaced apertures, of the same geometric configuration, which apertures are so positioned so that by shifting the screen one or more times, depending upon the configuration of the aperture, all of the area of a substrate positioned adjacent the screen will be exposed once, and only once. Although it is known that screens having various geometric configurations may be successfully employed in the practice of the invention, the invention specifically sets forth the embodiment of screens having hexagonal and square apertures. The invention may be practiced with screen process printing, electrostatic screen process printing, and xerographic process reproductions.

As the invention is applied to screen process printing, a screen (for the purposes of this explanation we will assume that a screen having hexagonal apertures is employed) is positioned between a stencil bearing the outline to be reproduced and a substrate. Means are provided for shifting the screen relative to the stencil and the substrate or, vice versa, shifting the stencil and substrate relative to the screen. Printing fluid is now applied to the stencil which fluid then deposits upon the substrate as permitted by the screen apertures, which in this instance are hexagonal. The copy of the substrate is now one-third produced. The screen is shifted a predetermined amount and the application of printing fluid or ink is again performed. At this point, the copy is now two-thirds produced. The screen is again shifted to its third position, which position now completely exposes all of the substrate to be printed only once, and the printing fluid applied. This completes the printing on the substrate and the substrate bears a faithful reproduction of the image desired as dictated by the stencil and, of course, the screen. Large extended areas of solid colors would be faithfully reproduced and the usual grayish tinge, when using black ink, whould be eliminated from the solid extended areas in which solid black was desired.

The invention as applied to electrostatic screen process printing achieves a similar result except that electrical potentials, toner, electrostatic charging means, toner applicators, etc. are necessary for the practice of the invention. As applied to this type of printing, the screen is positioned between the substrate and the stencil. In the electrostatic screen process, the toner is accelerated through the screen and stencil and deposited upon the substrate. The screen is shifted to a predetermined position, additional toner is applied to the accelerating electrode, and the toner is again accelerated through the screen and stencil to be deposited upon the substrate. The steps of shifting and accelerating are again repeated so that at the end of the two shifts (three applications of toner) all areas of the substrate to be printed have been exposed once and only once, and large extended areas have been uniformly printed.

When the invention is applied to xerography, the photoconductive coating or surface on a metal support is charged electrostatically as in the usual case. After charging, the photo-conductive surface is exposed to a pattern of uniform light sources, which for the purposes of explanation, are a plurality of uniform hexagonal light sources arranged so that three exposures will completely expose the entire photo-conductive surface. At this point, the photo-conductive surface has been discharged only in the areas where the hexagonal light sources have engaged the surface. The photo-conductive surface is now exposed to the document image to be reproduced. Next, the image on the photoconductive surface is transferred to a substrate through the usual steps of applying toner to the surface, electrostatically charging the substrate, bringing the substrate and surface into contact, removing the substrate from the surface, and then fixing the toner to the substrate.

Next, the pattern of light sources is shifted slightly to a new position where previously unexposed portions of the surface would now be exposed. All the foregoing steps of charging the photoconductive surface, exposing the surface of the pattern of hexagonal light sources, exposing the surface to the document image and transferring the image to the surface of the substrate are repeated twice with a shift of the pattern after each transfer to the substrate. During the entire process, the registry of the document image and the substrate must be maintained by returning them to the same position each time. Finally, after two shifts of the pattern, three exposures of the pattern and document image to the substrate, and three transfers to the substrate, a substrate bearing a faithful reproduction of the document image is available. Large extended areas which may have been solid black, are also solid black on the copy. Although additional steps have been injected into the xerographic process, the process has great utility when an accurate copy of an original is desired.

For the purposes of the explanation of this invention, the use of the term "original" or "original copy" will mean the copy used to reproduce other copies, even though the "original" may have been a copy of another document.

The invention both as to its organization and method of operation, together with further objects and advantages thereof will best be understood by reference to the following specification taken in conjunction with the accompanying drawings, in which:

FIGURE 7 is a plurality of block diagrams illustrating the steps of the invention as applied to screen process printing;

FIGURE 8 is a plan view of the apparatus for conducting the method as shown by the FIGURE 7;

FIGURE 9 illustrates the form of the indicia after the first application of printing fluid to the stencil, screen and substrate of the FIGURE 8;

FIGURE 10 is a plan view of the indicia of the FIGURE 9 after the first shift of the screen and subsequent application of printing fluid to the substrate;

FIGURE 11 illustrates the indicia after the second shift of the screen and the third application of printing fluid, the indicia being completely formed;

FIGURE 12 is an elevational view of the apparatus for practicing the invention as applied to electrostatic screen process printing;

Figure 1:
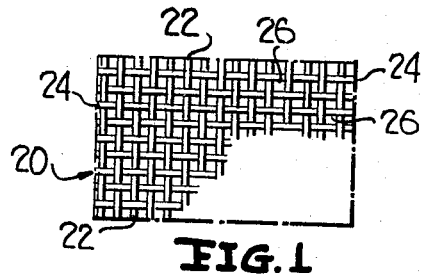
FIGURE 1 is a plan view of a conventional screen used in screen processing printing.

With reference to the FIGURE 1, a conventional screen 20 of silk, synthetic material, metal or other material is composed of the warp threads 22 running lengthwise of the screen and the woof threads 24 running across the screen. The screen 20 is a plain weave and ink or other printing material passes through the apertures 26 formed between the warp threads 22 and the woof threads 24.

From the plan view of the FIGURE 1, it will be intuitively clear that the threads 22 and 24 cover a substantial portion of a substrate, which would be placed below the screen 20, so that except for the viscous property of the printing fluid, no printing fluid would be deposited behind the threads 22 and 24. In fact, in many screens of the type used in screen process printing, such as the screen 20 of the FIGURE 1, only 35% of the area of the screen is devoted to the apertures while the remaining 65% of the screen is associated with the threads 22 and 24. Therefore, it will be readily understood that the proper entity for consideration in screen process printing is not the screen alone but the screen-stencil combination due to the influence of the threads 22 and 24 comprising the screen 20.

Figure 2:
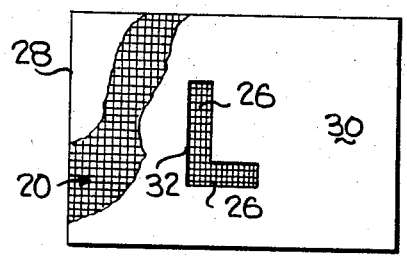
FIGURE 2 is a plan view, with portions removed, of a stencil, screen and substrate employed in conventional screen process printing.

In the FIGURE 2, the consideration of both the screen and stencil is amplified. A substrate 28, which receives the printing fluid and becomes the printed copy, is positioned below the screen 20 while a stencil 30 is positioned above the screen 20. The stencil 30 has a cutout indicia 32 which in the present example takes the form of an L. When printing material, such as ink, paint, etc., is rolled, sprayed, or applied in any other manner to the stencil 30 in the area of the indicia 32, certain of the printing material will pass through the apertures 26 of the screen 20 and be deposited upon the substrate 28. Thus, in the practice of the prior art as exemplified by the FIGURE 2, a solid character or indicia could not be formed on the substrate 28 since the threads 22 and 24 of the screen 20 block certain portions of the substrate 28 and inhibit the application of ink thereto. As previously set forth, methods have been devised to somewhat fill in behind the threads 22 and 24 by using printing materials of such viscosity that they flow substantially throughout the indicia; however, this procedure is limited in that the printing material will also flow along and outward from the edges of the indicia 32, thus presenting a ragged edge to the indicia.

The present invention will alleviate the problems set forth in relation to the FIGURES 1 and 2 in that the printing material is permitted to flow only through the apertures of a novel screen and subsequently, the screen is shifted to other positions which have not been previously exposed to new areas of the substrate. Screens of this type are shown in the embodiments of the FIGURES 3 and 5. Although screens having various configurations of apertures other than those shown may be successfully employed in the practice of the invention, it was believed illustrative of the invention to set forth the two embodiments shown in the FIGURES 3 and 5.

Figure 3:
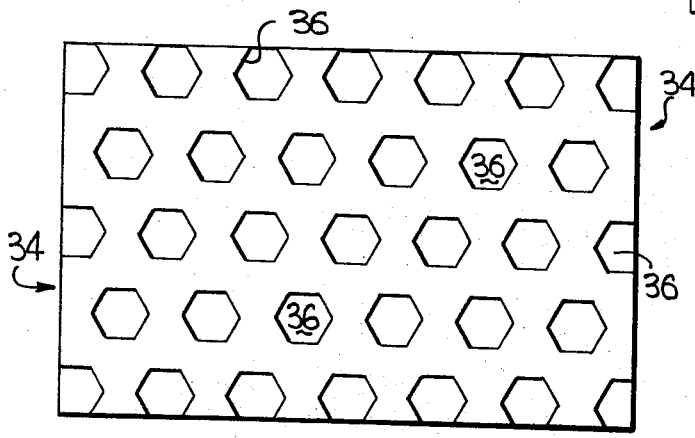
FIGURE 3 is a plan view of one embodiment of a novel screen employed in the practice of the invention.

For example, the screen 34 of the FIGURE 3 may be prepared from a thin solid sheet of cloth, plastic, metal, etc. by forming, such as by etching, punching, etc., the apertures 36 in a uniform spatial relationship throughout the screen 34, as shown.

Figure 4:
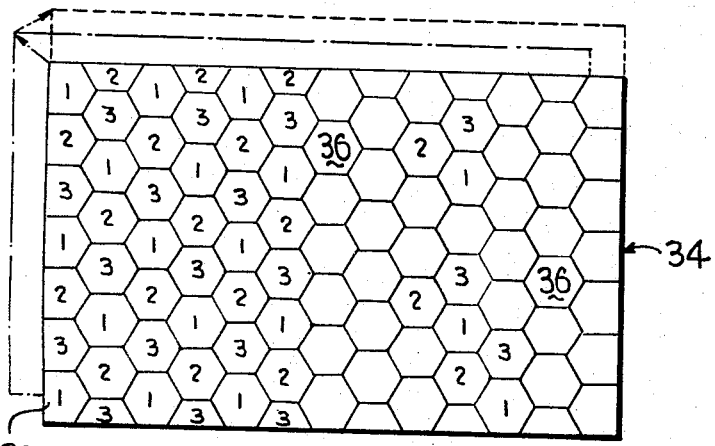
FIGURE 4 is a diagrammatic view illustrating the positions to which the apertures of the screen of the FIGURE 3 are shifted during certain steps of the printing process.

In the FIGURE 4, the positions of the apertures 36 are shown in their initial positions as well as their positions after the first shift and their positions after the second shift. When using a screen such as the type shown in the FIGURE 3 having the hexagonal apertures, three printing positions of the screen are required. Printing initially takes place with all of the screen apertures occupying the position shown as "1" in the FIGURE 4. Before the second step of printing, the apertures are shifted to the positions shown as "2" which may be a downward shift, a left-upward shift, or a right-upward shift. After the second application of printing material, the screen 34 is shifted to the position indicated by the "3" in the FIGURE 4. After the third application of printing fluid or material, the screen 34 is returned to its initial position indicated by "1." Although shifting of the screen 34 has been indicated, it will be readily understood that the substrate and stencil may be shifted in register relative to the screen 34 so that a similar objective is achieved. The shifting means are well known in the art and require no detailed explanation.

Figure 5:
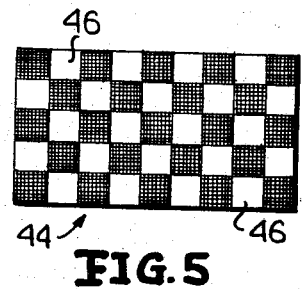
FIGURE 5 is a plan view of another type of screen which may be employed in the practice of the invention using xerographic printing.
Figure 6:
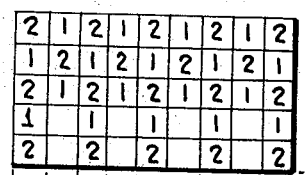
FIGURE 6 is a diagrammatic view illustrating the positions to which the apertures of the screen of the FIGURE 5 are shifted during one of the steps of the invention.

A second embodiment of a screen is shown in the FIGURE 5 which is a screen 44 having alternately arranged rectangular apertures 46. The screen 44 is shifted only once and to the positions indicated as "2" in the FIGURE 6, the "1" indicating the initial positions of the apertures. It is to be emphasized that the screens 34 and 44 are illustrative of preferred forms of the invention and that other screens having different geometric configurations of the apertures may produce satisfactory results.

With reference to the FIGURE 7, the block diagrams of that figure constitute the steps of practicing the invention as related to screen process printing. The invention will be described wherein a screen having hexagonal apertures will be employed, such as the screen 34 of the FIGURE 3. Initially, in screen process printing the stencil 30, bearing the indicia 32, is positioned over the screen 34', which screen 34' is positioned between the substrate 28 and the stencil 30. The foregoing step is shown in the block 48 of the FIGURE 7 and in its apparatus embodiment in the FIGURE 8. Next, printing fluid is applied as shown by the block 50 which may be by a roller 52 of the FIGURE 8. After the first application of printing fluid, the substrate 28 will appear as shown in the FIGURE 9 wherein the indicia 32 is approximately one-third formed by a plurality of hexagonal solid outlines, some of which do not completely appear as they are adjacent the edges of the indicia. The solid color hexagonal areas of the FIGURE 9 are shown as dotted or speckled so as to avoid solid black showing in the drawings.

In the next step, as illustrated by block 54, the screen 34' is shifted relative to the stencil 30 and substrate 28. It will be readily understood that the stencil 30 and substrate 28 may be shifted relative to the screen 34'; however, for the purpose of this explanation, the FIGURE 8 shows a pair of devices 56 and 56' for shifting the screen 34' the prescribed distance. The devices 56 and 56' may be spring-loaded cylinders, solenoids, etc. The ears 58 and 58' project from opposite sides of the screen 34' and have formed therein V-shaped apertures 60 and 60', respectively. The pins 62 and 62' are rigidly positioned and ride within the apertures 60 and 60' so as to produce the desired shifting, by steps, of the screen 34'. The resilient means 64 and 64' are connected to the ears 58 and 58', respectively, and return the screen 34' to its original or home position after the second shift and third application of printing fluid.

After the first shift of the screen 34' and the second application of printing fluid, the indicia 32 will appear as illustrated in the FIGURE 10. It will be noted that the apertures of the screen 34' have been shifted to a position previously unoccupied by any of the apertures so that no over-printing or double printing takes place. As illustrated in the FIGURE 10, two-thirds of the area of the substrate 28 has been covered with printing fluid. The next step will be to shift the screen apertures over the light background hexagonal areas still remaining to be printed in the FIGURE 10.

The final step in completing the printing of the area indicated by the indicia 32 of the stencil 30, is shown in the block 66 of the FIGURE 7. The screen is shifted as previously indicated so that the hexagonal apertures of the screen 34′ are positioned over the hexagonal white areas of the FIGURE 10 so that upon the application of printing fluid, the indicia 32 of the stencil 30 is reproduced as the indicia 32′ upon the substrate 28 which is a character having a uniform solid color throughout as illustrated in the FIGURE 11. Finally, the substrate 28 bearing the indicia 32′ is removed as illustrated in the block 68 of the FIGURE 7.

Although the method just set forth for shifting the screen 34′ with respect to the substrate 28, while keeping the stencil 30 and the substrate 28 in register can be successfully employed, another method, and perhaps a preferred method, would be to move the substrate 28 after the first printing operation to a second printing station and, (1), at which a second stencil having the same image pattern as that in the first printing station, is placed in register with the substrate 28 and, (2) at which the screen 34′ is moved, with respect to the stencil 30, from position 1 (see the FIGURE 4) to position 2. This sequence is repeated once more at a third printing station to complete the three part printing cycle. Using this sequence of three separate printing stations, the stencil and screen for each station would be made as an integral unit and not as two separate units as shown in the FIGURE 12.

As previously indicated, the invention has application tot he field of electrostatic screen process printing which is shown in the FIGURE 12. It will be understood that the horizontal elements of the FIGURE 12 are not necessarily shown in their operating spatial positions but are shown in exploded view for the purposes of clarity. Electrostatic screen process printing is known in the art as exemplified by co-pending applications Ser. No. 386,182 and Ser. No. 386,183, both filed on July 30, 1964, and assigned to the same assignee as the present invention. Accordingly, the discussion hereinafter will primarily be directed to the process as incorporating the screen and shifting technique as taught by the present invention.

As illustrated in the FIGURE 12, a base electrode 68 is electrically charged from a power supply 70 through a switch 72. The base electrode 68 supports the toner particles which are applied from a toner applicator 74. Although the base electrode 68 is shown as a somewhat rigid electrode, it will be readily understood that the base electrode 68 could be a moving belt-type of electrode so that the toner particles would be distributed across the entire electrode 68, as shown. Positioned immediately above the base electrode 68 is a screen 76 to which is coupled a shifting means 78. The screen 76, for the purposes of illustration, may be of the type disclosed in the FIGURE 3. If the screen of the FIGURE 3 is employed, three applications of toner and three positions of the screen 76 would be employed. Suitable voltages may be applied to the screen 76 from the power supply 70, as found expedient.

Positioned directly above the screen 76 is a stencil 80 which has the portion 82 removed to permit the passage of toner when the toner is accelerated by the electrical system. The stencil 80 will conform to the desired indicia upon which it is desired to form upon a substrate 84 positioned directly above the stencil 80. A back electrode 86 is positioned immediately adjacent the substrate 84 and is supplied electrical energy from the power supply 70 through a switch 88 and the conductor coupled thereto.

As is known in the art, electrostatic charges can be induced upon the toner material so that the application of a potential of like polarity to the base electrode 68, will cause the toner to be accelerated through the screen 76 and the stencil 80 to be deposited upon the substrate 84. The back electrode 86 may be given an unlike charge so as to assist in the deposition of the toner upon the substrate 84.

In electrostatic screen printing and in xerographic printing, the inability to uniformly print extended areas presents one of the greatest undesirable characteristics of these processes. Due to edge effects wherein the electric field is concentrated about the edges of extended areas, the toner, in the case of xerographic printing, tends to accumulate about the edges of the extended area while leaving the interior of the area less dense or in extreme cases, substantially free of toner so that only the substrate in the interior area is visible. In electrostatic screen printing, the inability to uniformly print extended areas arises from the fact that only 35% to 50% of the screen area is occupied by the open apertures of the screen. The apparatus of the FIGURE 12 employs the screen 76 which is manipulated by the shifting means 78 in a unique manner so as to break up the extended area and expose sequentially, small hexagonal areas uniformly distributed throughout the entire extended area, which extended area is represented by the cutout portions of the stencil 80.

After the screen 76 is positioned in its first or home position by the shifting means 78, the toner particles are applied to the base electrode 68 and accelerated through the screen 76 and the stencil 80 to be deposited upon the substrate 84. After this initial printing step, the indicia would be somewhat similar to that represented in the FIGURE 9. Next, the screen 76 may be shifted by the shifting means 78 to its No. 2 position as illustrated in the FIGURE 4, and after the toner is again applied to the base electrode 68 and the proper electrical potentials applied to the electrodes, the toner is again accelerated toward the substrate 84 and is now deposited upon the substrate 84 in a pattern such as that illustrated in the FIGURE 10. Lastly, the screen 76 is shifted by the shifting means 78 to its No. 3 position as illustrated by the FIGURE 4 and it will be noted that each of the three positions of the screen 76 has been exposing a unique area of the substrate 84 in that all areas have been exposed once and no area exposed more than once. After the toner is again applied to the base electrode 68 and accelerated through the screen 76 and the stencil 80, it is deposited upon the substrate 84 and now appears as a solid pattern such as that illustrated in the FIGURE 11. Thereafter, the substrate 84 may be removed and the toner fixed if such is desirable. Screens having other geometric configurations may require a different number of shifting steps, as appropriate, to permit all areas of the substrate to be exposed once and only once.

Figure 13:
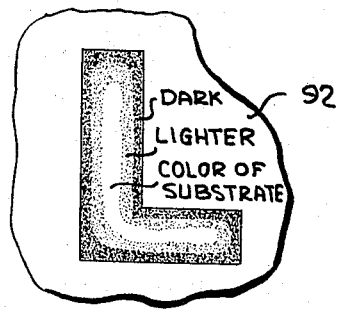
FIGURE 13 is a plan view of indicia usually formed by the prior art using xerographic printing and wherein the "edge effects" have caused a concentration of the printing material along the edges of the indicia with the interior portions retaining substantially the color of the substrate.

As previously set forth, the invention also has applicability to the xerographic process, as will now be explained. As noted, one of the deficiencies of the xerographic process, is its inability to uniformly reproduce extended areas. For example, with reference to the FIGURE 13, prior to the present invention any extended areas were reproduced as shown in that figure. For example, the indicia 90 on a substrate 92 was reproduced with the outer edges being dark, followed by lighter edges toward the inner areas and finally the center portions would be untouched by toner so that it was the color of the substrate. The present invention will permit an indicia such as the indicia 90 illustrated in the FIGURE 13, to be printed with a dark uniform color throughout its entire area.

Figure 14:
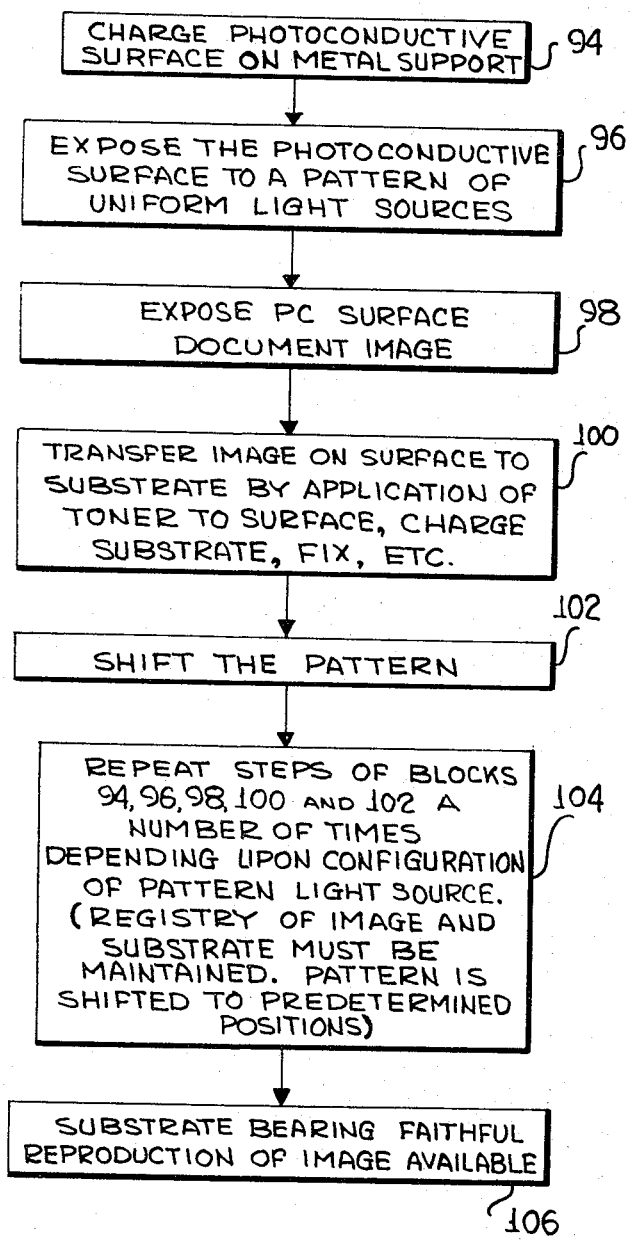
FIGURE 14 is a series of block diagrams illustrating the steps of the invention when applied to xerographic printing processes.

The FIGURE 14 is a block diagram illustrating the steps of the invention when a screen having hexagonal apertures is employed. It will be understood that other screens having other configurations of apertures may be successfully practiced, such as the rectangular apertured screen of the FIGURE 5.

The transfer electrostatic process or xerographic process in which the steps are illustrated in the FIGURE 14, makes use of the photo-conducting properties of a substance such as amorphous selenium. Amorphous selenium will hold an electrostatic charge in the dark but will allow it to be dissipated wherever the coating of selenium is exposed to light. Initially, a photo-conductive surface or coating of a metal support is given a uniform, positive electric charge. The electrostatic charging is performed by passing the photo-conductive surface under a series of corona discharge wires in the absence of light. For the purposes of this explanation, the selenium has been selected and is given a positive charge whereas it will be understood other materials may be employed and may be given a negative charge.

Next, the photo-conductive surface is exposed to a pattern of uniform light sources as shown in the block 96. The pattern of uniform light sources may be produced by a light source positioned behind the hexagonal apertured screen of the previous figures and then exposed to the photo-conductive coating or it may be a plurality of uniformly positioned hexagonal reflective surfaces positioned upon a non-reflective background and when light is exposed to the hexagonal reflective surfaces, it will be reflected to the surface of the photo-conductive coating. As a result, the photo-conductive surface now becomes discharged through its area with a pattern of uniformly positioned hexagonal apertures. Next, the photo-conductive surface is exposed to a document image as illustrated by the block 98. After exposure of the photo-conductive surface to the document image, the latent image on the photo-conductive surface is developed and transferred to the substrate as illustrated by the block 100. The transfer process illustrated by the block 100 includes the mixing of toner material with a carrier which is cascaded across the photo-conductive surface. The toner, which comprises a pigmented fusible resin or plastic, is negatively charged and adheres by electrostatic attraction to the positively charged areas of the photo-conductive surface. This operation forms a powder or toner material image of the original.

Continuing, a substrate or sheet of ordinary untreated paper is placed over the powder image and given a positive electrostatic charge by corona discharge wires. As a result, most of the negatively charged toner on the surface is transferred to the substrate. Finally, the substrate is heated to approximately 110° C. to melt the thermoplastic powder and bond it to the substrate.

Now, the next step is the shifting of the pattern of uniform light sources as shown by the block 102 which corresponds to the shifting of the screen in the electrostatic screen process shown in the FIGURE 12. The shifting of the pattern illustrated in the block 102 will be such so as to discharge, when exposed to the newly charged photo-conductive surface, a pattern of hexagonal dots on the surface of the photo-conductive coating in areas which were not previously discharged by the first exposure of the photo-conductive surface to the pattern of uniform light sources.

Moving on, the next block 104 repeats the steps of the blocks, 94, 96, 98, 100 and 102 a number of times depending upon the configuration of the pattern light source. In the particular embodiment which has been described and utilizing a pattern of uniform hexagonal light sources so positioned so as to entirely expose a surface with three exposures, the block 104 would be repeated twice and the last shift of the pattern would be to its home or initial position. Each time the document image is positioned for exposure and the substrate is positioned for transfer of the toner particles to it, registry must be maintained in that the pattern and the substrate must be positioned in substantially identical positions throughout the entire reproduction process. After the third transfer of the image to the substrate, a substrate bearing a faithful reproduction of the document image is available as indicated by the block 106.

After the first transfer of the image from the surface to the substrate, the substrate would have an appearance similar to that illustrated in the FIGURE 9. After the second transfer of the image on the surface to the substrate, the substrate would have the appearance as illustrated in the FIGURE 10. Lastly, after the final transfer of the image to the substrate, the image would be completely solid and of uniform density as shown by the FIGURE 11.

Figure 15:
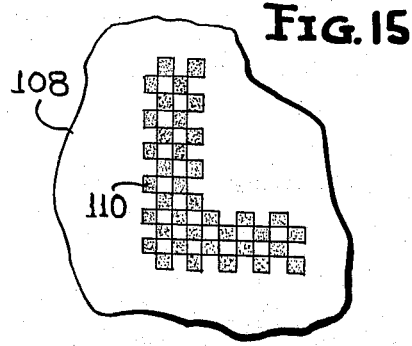
FIGURE 15 is similar to the FIGURES 9 and 10 except that the formation of the indicia is shown when a rectangular screen is employed.
Figure 16:
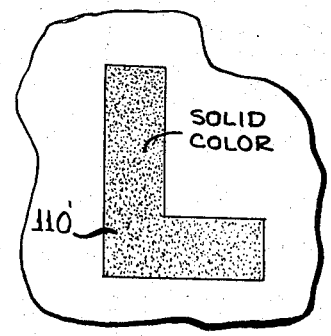
FIGURE 16 illustrates the completely formed indicia after a shift of the screen and subsequent application of printing material to the indicia of the FIGURE 15.

In the event that a rectangular screen such as that illustrated in the FIGURE 5 is employed in the xerography method illustrated by the blocks of the FIGURE 14, then the substrate would have the appearance such as that of the substrate 108 illustrated in the FIGURE 15. It will be noted that one-half of the area has been printed, and after the shift of the screen or the pattern, the other half of the indicia 110 is reproduced or printed so that it now takes on a uniform solid extended area such as illustrated by the FIGURE 16 and identified as the indicia 110'.

Thus, there has been described a method and apparatus for improving printing and reproduction techniques in the fields of screen process printing, electrostatic screen printing, and xerography. A common deficiency as illustrated in the prior art, is the inability of the processes to print a uniform extended area. In addition, low resolution was many times achieved and the process failed to faithfully reproduce tones and/or the proper degree of saturation. By employing a screen having uniformly positioned apertures of geometric configuration, and manipulating the screen in the manner set forth, a tremendous improvement of printing and reproduction quality is achieved. The apertures are so positioned upon the screen that after a predetermined number of shifts, all areas of the substrate or surface to be exposed have been exposed once and only once. For example, in the use of a rectangular screen, the apertures will constitute one-half of the total screen area so that only a single shift is required to expose the entire area. Continuing, hexagonal apertures may be positioned upon a screen in such a manner that two shifts of the screen with three exposures of the apertures to the substrate, will expose the entire surface. In screens having hexagonal openings or apertures, the aperture area would be equal to one-third of the screen area. Applying simple mathematics, if the entire area to be printed is one and the area of the aperture is one-third, then one divided by one-third, equals 3 positions to cover the entire area and apply printing material or toner after each position.

Thus, the present invention may be embodied in other specific forms without departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. A printing process of the type employing a stencil and a screen comprising the steps of providing a stencil having openings therein defining an image area to be printed, providing a screen member having a plurality of unobstructed openings therein in registry with said stencil, positioning a substrate to be printed upon in registry with the stencil and screen, applying a printing substance for forming an image upon the substrate as indicated by the stencil and screen, shifting the screen in a predetermined pattern relative to the stencil and substrate, and subsequently repeating the step of applying printing substance as dictated by the stencil and screen to the same substrate, said shifting step causing said printing substance to be applied to at least partially different areas of said substrate in each of said applying steps.

2. A printing process as defined in claim 1 including the step of maintaining the substrate and stencil in initial registry relative to each other during each step of applying the printing substance to the substrate.

3. A printing process as defined in claim 1 wherein the steps of applying the printing substance to the substrate are restricted to coating the substrate for producing a final print which conforms to the outline of openings in said stencil.

4. A printing process of the type employing a screen and a stencil comprising the steps of providing a stencil having openings therein defining an image area to be printed, providing a screen member having a plurality of unobstructed hexagonal openings therein in registry with said stencil, positioning a substrate to be printed upon in registry with the stencil and screen, applying a printing substance for forming an image upon the substrate as dictated by the stencil and screen, causing a rectilinear shift of the screen a distance equal to an aperture opening before repeating the step of applying the substance to the same substrate, causing a second shift of the screen to a position wherein each of the apertures occupies a spatial position not previously occupied by an aperture, and subsequently repeating the step of applying printing substance to the same substrate, said shifting step causing said printing substance to be applied to at least partially different areas of said substrate in each of said applying steps.

5. In an electrostatic printing process of the type employing a stencil and a screen comprising the steps of providing a stencil having openings therein defining an image area to be printed, providing a screen member having a plurality of unobstructed openings therein in registry with said stencil, positioning a substrate to be printed upon in registry with the stencil and screen, causing toner particles to be accelerated toward the substrate for forming an image upon the substrate as dictated by the stencil and screen, shifting the screen in a predetermined pattern and subsequently before repeating the step of causing toner particles to be accelerated toward the same substrate, said shifting step causing said toner particles to be applied to at least partially different areas of said substrate in each of said steps of causing toner particles to be accelerated toward the substrate.

6. In an electrostatic printing process of the type employing a stencil and a screen comprising the steps of providing a stencil having openings therein defining an image area to be printed, providing a screen member having a plurality of unobstructed openings therein in registry with said stencil, positioning a substrate to be printed upon, aligning said stencil and a screen with the substrate, the stencil being positioned between the screen and the substrate, causing toner particles to be accelerated toward the substrate for forming an image upon the substrate as dictated by the stencil and screen, and shifting the screen to a predetermined position before repeating the step of causing toner particles to be accelerated toward the substrate for application to the same substrate, said shifting step causing said toner particles to be applied to at least partially different areas of said substrate in each of said steps of causing toner particles to be accelerated toward the substrate.

7. In an electrostatic printing process of the type employing a stencil and a screen comprising the steps of forming a screen having uniformly spaced hexagonal openings, providing a stencil having openings therein defining an image area to be printed, aligning said stencil and the screen with a substrate to be printed upon, the stencil being positioned between the screen and the substrate, applying a substance to the screen for forming an image upon the substrate as dictated by the stencil and the screen, and shifting the screen to a predetermined position before repeating the step of applying substance to the screen for application to the same substrate, said shifting step causing said substance to be applied to at least partially different areas of said substrate in each of said applying steps.

8. In an electrostatic printing process of the type employing a stencil and screen comprising the steps of forming a screen having uniformly spaced hexagonal apertures, providing a stencil having openings therein defining an image area to be printed, aligning said stencil and the screen with a substrate to be printed upon, the stencil being positioned between the screen and the substrate, applying a substance to the screen for forming an image upon the substrate as dictated by the stencil and the screen, causing a rectilinear shift of the screen a distance equal to the maximum measurement of an aperture before repeating the step of applying the substance to the same substrate, causing a second shift of the screen to a position wherein each of the apertures occupies a spatial position not previously occupied by an aperture, and repeating the step of applying substance for forming an image upon the same substrate, said shifting step causing said substance to be applied to at least partially different areas of said substrate in each of said applying steps.

9. In an electrostatic printing process of the type employing a stencil and a screen comprising the steps of forming a screen having uniformly spaced rectangular apertures arranged in rows and columns wherein the space between apertures is equal to the width of the aperture, providing a stencil having openings therein defining an image area to be printed, aligning said stencil and the screen with a substrate to be printed upon, the stencil being positioned between the screen and the substrate, applying a substance to the screen for forming an image upon the substrate as dictated by the stencil and screen, causing a rectilinear shift of the screen a distance equal to the distance of the aperture and to a position wherein each of the apertures occupies a spatial position not previously occupied by an aperture, and repeating the step of applying substance to the screen for forming an image upon the same substrate, said rectilinear shifting step causing said substance to be applied to at least partially different areas of said substrate in each of said applying steps.

10. An electrostatic printing process of the type employing a stencil and a screen comprising the steps of positioning a substrate to be printed upon, providing a stencil having openings therein defining an image area to be printed, providing a screen having a plurality of unobstructed openings therein a registry with said stencil, aligning said stencil and said screen with the substrate, the stencil being positioned between the screen and substrate, positioning an electrode adjacent the screen for receiving toner particles, accelerating the toner particles from the electrode and to the substrate for forming an image upon the substrate as dictated by the stencil and screen, and shifting the screen to a predetermined position before repeating the step of accelerating said toner particles to the screen for application to the same substrate, said shifting step causing said toner particles to be applied to at least partially different areas of said substrate in each of said applying steps.

11. The method as defined in claim 10 including the step of positioning an electrostatically charged electrode adjacent the substrate for aiding in the uniform distribution of said toner particles upon the substrate.

12. An electrostatic printing process of the type employing a stencil and a screen comprising the steps of positioning a substrate to be printed upon, providing a stencil having openings therein defining an image area to be printed, providing a screen having a plurality of unobstructed openings therein in registry with said stencil, aligning said stencil and said screen with the substrate, the stencil being positioned between the screen and the substrate, positioning an electrode adjacent the screen for accelerating toner particles to the substrate as dictated by the stencil and screen, causing a rectilinear shift of the screen a distance equal to a screen opening before accelerating additional toner particles toward the same substrate, causing a second shift of the screen to a position wherein each of the screen openings occupies a spatial position not previously occupied by an opening, and repeating the step of accelerating toner particles toward the same substrate, said shifting step causing said toner particles to be applied to at least partially different areas of said substrate in each of said steps of accelerating toner particles toward the substrate.

13. A printing apparatus of the type employing a stencil and a screen for printing upon a substrate comprising a stencil having openings defining an image to be reproduced, a screen adjacent said stencil in a predetermined spatial position and having uniformly spaced apertures wherein the aperture area is in integer relationship to the screen area, means for causing a printing substance to pass through said stencil opening and screen apertures for applying said printing substance to a substrate as permitted by said stencil openings and screen apertures, and means for shifting said screen with respect to said stencil to another predetermined spatial position and subsequently applying additional printing substance to the same substrate.

14. A printing apparatus of the type employing a stencil and a screen for printing upon a substrate comprising a stencil having openings defining an image to be reproduced, a screen adjacent said stencil in a predetermined spatial position and having uniformly spaced hexagonal apertures arranged in rows and columns wherein the aperture area is in integer relationship to the screen area, means for causing a printing substance to pass through said stencil openings and screen apertures for applying said printing substance to a substrate as permitted by said stencil openings and screen apertures, and means for shifting said screen to a second and to a third predetermined spatial position, each of said positions being previously unoccupied by an aperture, before applying additional printing substance to the same substrate after each shift.

15. An electrostatic printing apparatus of the type employing a stencil and a screen for printing upon a substrate comprising a stencil having openings defining an image to be reproduced, a screen adjacent said stencil in a predetermined spatial position relative thereto and having uniformly spaced apertures wherein the aperture area is in integer relationship to the screen area, electrical means for accelerating toner particles through said stencil and screen for forming an image upon a substrate as permitted by said stencil openings and screen apertures, and means for shifting said screen with respect to said stencil to a second predetermined spatial position before applying additional toner particles to the same substrate.

16. An electrostatic printing apparatus of the type employing a stencil and a screen for printing upon a substrate comprising a stencil having openings defining an image to be reproduced, a screen in a first predetermined spatial position adjacent said stencil and having uniformly spaced hexagonal apertures arranged in rows and columns wherein the aperture area is in integer relationship to the screen area, electrical means for accelerating toner particles for transfer to a substrate as permitted by said stencil openings and screen apertures, and means for shifting said screen to a second and to a third predetermined spatial position, each of said positions being previously unoccupied by an aperture, and subsequently accelerating toner particles to the same substrate after each shift.

17. A transfer electrostatic reproduction process comprising the steps of providing a member having a photoconductive surface, electrostatically charging said photoconductive surface, exposing the photoconductive surface to a pattern of uniformly and symmetrically arranged light sources, exposing the surface to a document image to thereby form a latent image on said surface, applying a printing substance to said surface to develop a reproduction of said latent image, transferring said reproduction of the image from the surface to a substrate, recharging the photoconductive surface, performing at least one shifting operation of said pattern relative to the surface and re-exposing the surface to the pattern, re-exposing the surface to the same document image after each re-exposure of the surface to the pattern, again applying a printing substance to said surface to deevlop a second reproduction of the latent image, and transferring said second reproduction of the image from the surface to the same substrate after each re-exposure of the surface.

18. A transfer electrostatic reproduction process comprising the steps of providing a member having a photoconductive surface, electrostatically charging said photoconductive surface, exposing the photoconductive surface to a pattern of uniformly and symmetrically arranged light sources arranged in rows and columns, the exposed and unexposed areas being in integer relationship, exposing the surface to a document image to thereby form a latent image thereon, applying toner to said latent image to develop a reproduction thereof, transferring said reproduction of the image from the surface to a substrate, re-charging the photoconductive surface, shifting and re-exposing the pattern to the surface at least once, the shift of the pattern being to a predetermined position previously unoccupied by a light source, re-exposing the surface to the same document image after each re-exposure of the pattern to the surface to form a second latent image, applying additional toner to said latent image to form a reproduction thereof, and transferring said reproduction of the second image from the surface to the same substrate after each re-exposure of the surface.

19. A transfer electrostatic reproduction process comprising the steps of electrostatically charging a photoconductive surface, exposing one-third of the area of said surface to a pattern of uniformly spaced equilateral hexagonal light sources arranged in rows and columns, exposing the surface to a document image to form a latent image thereon, transferring a reproduction of the image from the surface to a substrate, recharging the photoconductive surface, rectilinearly shifting the pattern a distance equal to the length between parallel sides of a hexagonal light source, re-exposing the pattern screen to the photoconductive surface, exposing the surface to the same document image to form a latent image thereon, again transferring a reproduction of the image from the surface to the same substrate, re-charging the photoconductive surface, again shifting the pattern to a position wherein the light sources occupy spatial areas not previously occupied by light sources, re-exposing the pattern to the photoconductive surface, again exposing the surface to the same document image, and finally transferring a reproduction of the image from the surface to the same substrate.

20. A printing apparatus of the type employing stencils and screens for printing upon a substrate to transfer a pattern from substantially identical stencils comprising a first printing station including a stencil having an image formed thereon and a screen selectively positioned and integral with said stencil and having uniformly spaced apertures wherein the aperture area is in integer relationship to the screen area, a second printing station formed of a substantially identical stencil and a screen integral with said stencil and shifted a predetermined amount with respect to the previous screen-stencil relationship to expose new areas of said stencil not exposed at said first printing station, a third printing station formed of a substantially identical stencil and a screen integral with said stencil and shifted a predetermined amount with respect to the previous screen-stencil relationship to expose new areas of said stencil not exposed at said first printing station and said second printing station, means for applying printing material at each printing station to said stencil-screen to deposit upon a substrate in accordance with said stencils, and means for moving said substrate between printing stations.

21. A printing process of the type employing a screen and a stencil comprising the steps of providing a stencil having openings therein defining an image area to be printed, providing a screen member having a plurality of unobstructed and uniformly spaced hexagonal openings therein in registry with said stencil, positioning a substrate to be printed upon in registry with the stencil and screen, applying a printing substance to said substrate for forming an image upon the substrate as dictated by the stencil and screen, moving the substrate into registry with a second substantially identical stencil and screen, the second screen being shifted to expose image areas of the second stencil corresponding to image areas not previously exposed, repeating the step of applying a printing substance to said substrate, moving the substrate into registry with a third substantially identical stencil and screen, third screen being shifted to expose areas of the third stencil corresponding to image areas not previously exposed, and again repeating the step of applying a printing substance to said substrate so that the pattern on said stencils is faithfully reproduced on the substrate.

References Cited

UNITED STATES PATENTS

| | | | |
|---|---|---|---|
| 2,485,607 | 10/1949 | Kasperowicz | 101—129 XR |
| 2,573,881 | 11/1951 | Walkup et al. | |
| 2,598,732 | 6/1952 | Walkup. | |
| 2,625,734 | 1/1953 | Law | 101—426 XR |
| 2,767,457 | 10/1956 | Epstein | 156—67 |
| 2,807,233 | 9/1957 | Fitch. | |
| 2,808,328 | 10/1957 | Jacob | 96—1 |
| 2,857,290 | 10/1958 | Bolton. | |
| 2,940,864 | 6/1960 | Watson. | |
| 3,081,698 | 3/1963 | Childress et al. | 101—129 |

FOREIGN PATENTS 81,920  9/1956  Denmark.

EUGENE R. CAPOZIO, *Primary Examiner.*

ROBERT E. PULFREY, E. S. BURR, *Examiners.*